United States Patent [19]
McSherry et al.

[11] Patent Number: 5,406,743
[45] Date of Patent: Apr. 18, 1995

[54] INSECT TRAPS

[75] Inventors: Bernice J. McSherry, Canton; Michael J. Grady, Wellesley, both of Mass.

[73] Assignee: Green Leaf Products, Inc., Wellesley, Mass.

[21] Appl. No.: 891,959

[22] Filed: Jun. 2, 1992

[51] Int. Cl.[6] .................................... A01M 1/10
[52] U.S. Cl. .............................. 43/122; 43/107
[58] Field of Search ........................ 43/107, 122

[56] References Cited

U.S. PATENT DOCUMENTS

| | | | |
|---|---|---|---|
| 818,836 | 4/1906 | Lenthier | 43/122 |
| 983,977 | 1/1911 | Lilge | 43/122 |
| 1,053,714 | 2/1913 | Crichton | 43/122 |
| 1,072,342 | 9/1913 | Louviere | 43/107 |
| 1,084,647 | 1/1914 | Libison | 43/107 |
| 1,385,207 | 7/1921 | Gardon | 43/107 |
| 1,772,729 | 8/1930 | Pisani | 43/107 |
| 1,882,380 | 10/1932 | Brain | 43/107 |
| 4,794,724 | 1/1989 | Peters | 43/107 |
| 5,228,233 | 7/1993 | Butler et al. | 43/107 |

*Primary Examiner*—Kurt Rowan
*Attorney, Agent, or Firm*—Paul J. Cook

[57] ABSTRACT

An insect trap is provided comprising a container having a bottom to support a liquid bait add a bait tray for a solid bait. Insect entry ramps extend through the container walls and are spaced apart a short distance from the bait tray.

7 Claims, 2 Drawing Sheets

INSECT TRAPS

BACKGROUND OF THE INVENTION

This invention relates to an insect trap, particularly for stinging insects such as wasps or the like.

Wasps and yellow jackets are known to consume sweet liquid carbohydrates such as is obtained from rotting fruit for their own sustenance. In addition, the workers of the insect colony forage for proteinaceous food in order to feed the larvae in the nests.

It has been proposed in U.S. Pat. No. 4,794,724 to provide an insect trap, particularly for stinging insects. The trap comprises a container having walls, a bottom and a removable top. The walls include holes through which are fit entry means for the insect to the container interior. The entry means comprises a one-piece construction which extends across the container interior and is secured to opposing walls of the container. The entry means serves as both an entryway for the insect and as a support for solid bait for the insect. Since the entry means is a one-piece construction, the insect within a container is free to exit the container merely by walking along the entry means and out of the container hole with solid bait.

It would be desirable to provide an insect trap which renders difficult exit by the insect from the trap. It would also be desirable to provide an insect trap which provides an alternative route away from a bait within the trap which also is a route away from entrance means into the trap.

SUMMARY OF THE INVENTION

The present invention provides an insect trap containing a container which contains both liquid and solid bait for insects. Liquid bait is housed in the bottom portion of the container while solid bait is housed on a bait tray positioned above the liquid bait. One or more entry means are provided extending from one or more holes in the container wall. The entry means comprises an open ramp upon which an insect can walk. Each ramp extends into the container to a short distance from the bait tray. The ramp is open to the container interior so that the insect is free to fly from the ramp and within the container. The bait tray is spaced apart from each entry ramp so that the insect is forced to fly away from the bait tray rather than walk back through the wall hole by way of the entry ramp. The bait tray is supported by legs which are sufficiently wide to permit the insect to walk away from the bait tray and away from the entry hole but not so wide as to hold a dead or exhausted insect.

DESCRIPTION OF SPECIFIC EMBODIMENTS

In accordance with this invention, an insect trap utilizing a container, entry ramp means into the container and a bait tray for solid bait within the container is constructed so that the entry ramp means are spaced apart a short distance from the bait tray, usually between about $\frac{1}{4}$ and $\frac{1}{2}$ inch, preferably between about $\frac{1}{4}$ and $\frac{3}{8}$ inch. This construction permits the insect to enter the trap by walking into the trap and forces the insect to initiate flying within the trap in order to obtain the solid bait. In addition, the insect is forced to fly after obtaining the solid bait and is thereby prevented from walking back on the entry ramp to exit the trap. The insect becomes exhausted after flying with the bait within the trap and drowns in the liquid bait at the bottom of the container. The bait tray is supported either by the container wall or the container bottom. The bait tray support means can comprise various ramps so that the insects can walk away from the entry means but is not retained on the narrow ramp when dead or exhausted. The construction of this invention provides substantial improvement in insect retention as compared to a construction where a bait tray is connected to an entry ramp within a trap.

Figure 1:
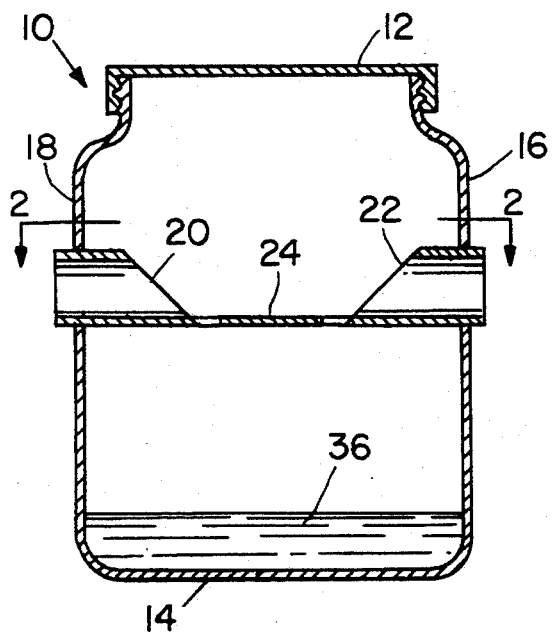
FIG. 1 is a side cross sectional view of one embodiment of this invention.
Figure 2:
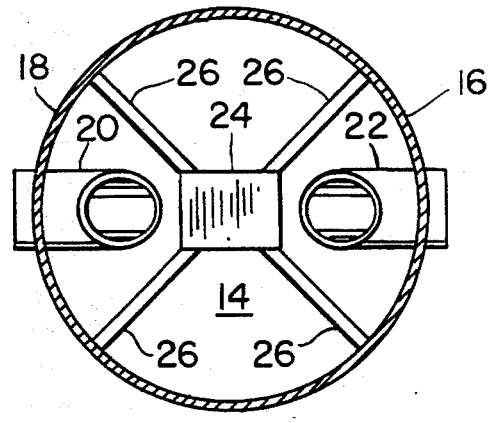
FIG. 2 is a top view in cross-section taken along line 2—2 of FIG. 1.

Referring to FIGS. 1 and 2, a container 10 includes a permanent or removable top 12, a bottom 14 and side walls 16 and 18. The top can be screwed or snap fit, for example on the container 10. Insect entry ramps 20 and 22 are secured to walls 16 and 18 through holes in the walls 16 and 18. The entry ramps 20 and 22 can be snap fit into the walls 16 and 18 for example. A bait tray 24 for solid proteinaceous bait is provided which is spaced apart from the entry ramps 20 and 22 a short distance, between about $\frac{1}{2}$ and $\frac{1}{4}$ inch and preferably between about $\frac{1}{4}$ and $\frac{3}{8}$ inch. The bait tray 24 is supported by legs 26 which are secured to walls 16 and 18. The legs 26 have a width between about 3/16 and $\frac{1}{2}$ inch to permit an insect to walk on them but are not so wide as to prevent an exhausted insect to fail to the bottom 14 of container 10.

Figure 3:
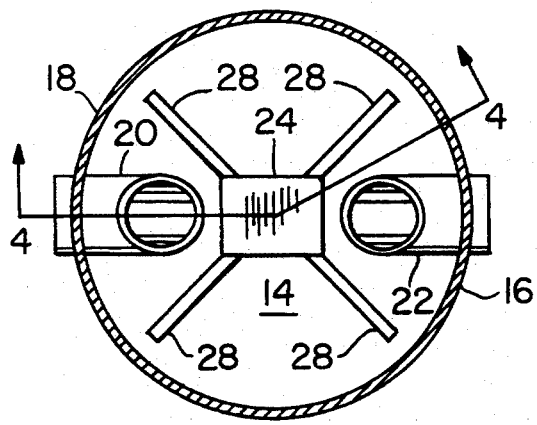
FIG. 3 is a top view in cross-section of an alternative embodiment of this invention.
Figure 4:
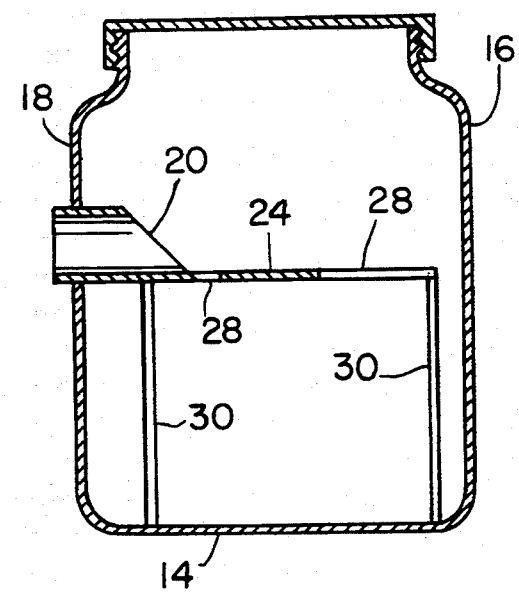
FIG. 4 is a side view in cross-section of the embodiment of FIG. 3 taken along line 4—4.

Referring to FIGS. 3 and 4 where like elements are identified by the same reference numerals as in FIGS. 1 and 2, an embodiment of this invention is shown wherein the bait tray 24 is supported by legs extending to the bottom 14 of container 10. The tray 24 is supported by horizontal legs 28 and vertical legs 30 which are secured to bottom 14. The ramps 20 and 22 are shown in FIGS. 1–4 as being at essentially the same height as the bait tray 24. The bait tray 24 also can be positioned slightly lower, about $\frac{1}{4}$ to $\frac{1}{2}$ inch lower than the ramps 20 and 22, so that the insect can view the bait and fly to it.

Figure 5:
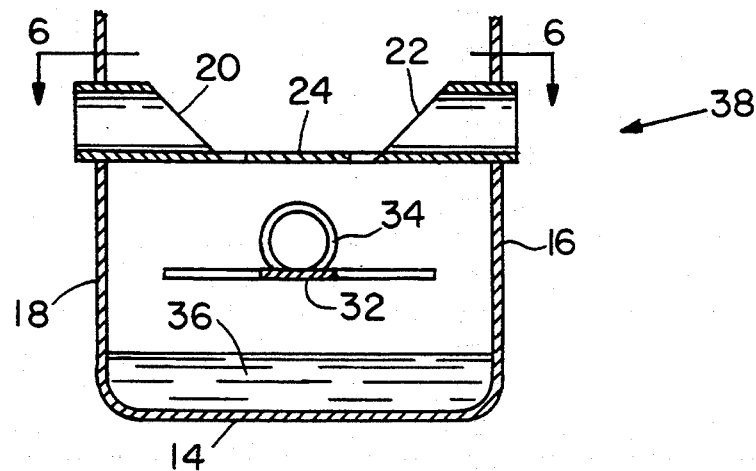
FIG. 5 is a side cross-sectional view of a trap having a plurality of bait trays.
Figure 6:
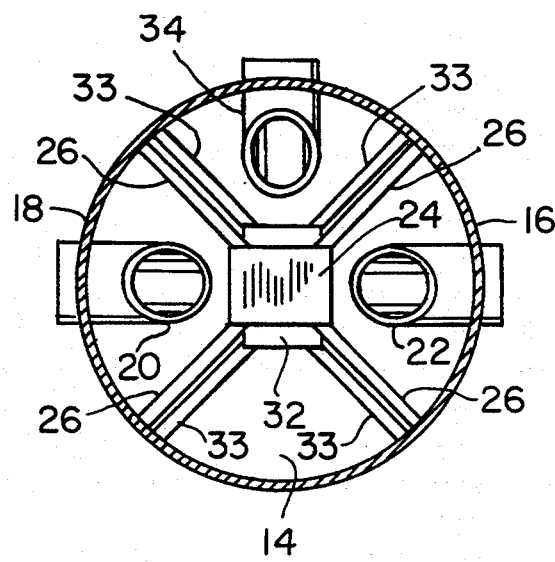
FIG. 6 is a cross-sectional view taken along line 6—6 of FIG. 5.

The embodiment of this invention having multiple bait trays and associated insect entry ramps are shown in FIGS. 5 and 6. In FIGS. 5 and 6, the same reference numerals as used in FIGS. 1–4 identify the same elements. The lower bait tray 32 is supported by legs 33 having the same dimensional size range as legs 26. The legs 33 also are secured to the walls 16 and 18. An insect entry ramp 34 is provided for bait tray 32. A liquid bait 36 such as carbohydrate is provided in the bottom portion of containers 10 and 38.

In use, the insect enters the container 10 or 38 through ramps 20, 22 or 34 and is forced to fly to the bait tray 24 or 32. After obtaining the solid bait, the insect is forced either to fly away from the bait tray or to walk away from the entry ramps along legs 26 or 33.

The insect flies within the container until exhausted and drops into the liquid bait to be drowned. A removable top can be removed to clean out the container and to supply new bait so that the container can be reused.

We claim:

1. An insect trap comprising a container having a bottom, side walls and a top,
   at least one hole, extending through at least one of said side walls,
   at least one insect entry ramp secured to said container and extending through each of said holes,
   a bait tray for solid bait positioned within said container at essentially the same height as said entry ramp, said bait tray being spaced apart a short distance from an entry ramp to form an air space of between about $\frac{1}{4}$ and $\frac{1}{2}$ inch between said bait tray and said entry ramp,
   and legs within said container connected either (a) to said side walls or (b) to said bottom and to said bait tray to support said bait tray, said legs being spaced apart from said entry ramp.

2. The trap of claim 1 which includes a plurality of said bait trays at different vertical heights within said container, each of said bait trays being positioned a short distance from an entry ramp to form an air space of between about $\frac{1}{4}$ and $\frac{1}{2}$ inch between each bait tray and an entry ramp secured to a wall of said container.

3. An insect rap comprising a container having a bottom, side walls and a top,
   at least one hole, extending through at least one of said side walls,
   at least one insect entry ramp secured to said container through each of said holes,
   a bait tray for solid bait positioned within said container at a slightly lower height than said entry ramp, said bait tray being spaced apart a short distance from said entry ramp to form an air space of between about $\frac{1}{4}$ and $\frac{1}{2}$ inch between said bait tray anti said entry ramp,
   and legs within said container connected either to (a) said side walls or (b) to said bottom and to said bait tray to support said bait tray, said legs being spaced apart from said entry ramp.

4. The trap of claim 1 which includes a plurality of said bait trays at different vertical heights within said container, each of said bait trays positioned at a slightly lower height from said entry ramp secured to said wall of said container to form an air space between about $\frac{1}{4}$ and $\frac{1}{2}$ between each bait tray and said entry ramp.

5. The top of any one of claims 1, 2, 3 or 4 wherein said bait tray is secured to the wall of said container.

6. The trap of any one of claims 1, 2, 3 or 4 wherein said bait tray is secured to the bottom of said container.

7. The insect trap of any one of claims 1, 2, 3 or 4 having a plurality of entry ramps and said bait tray being spaced apart a short distance from said entry ramps to form an air space of between about $\frac{1}{4}$ and $\frac{1}{2}$ inch between said bait tray and all of said entry ramps.

* * * * *